J. C. WELCH.
BEARING.
APPLICATION FILED APR. 2, 1919.
1,359,007. Patented Nov. 16, 1920.
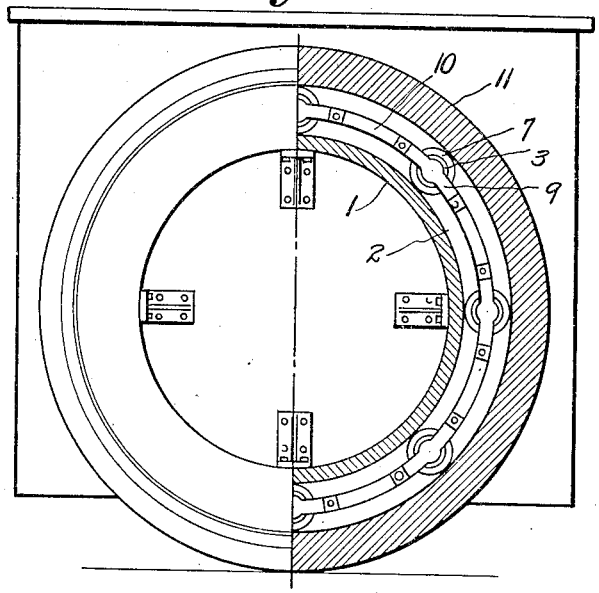
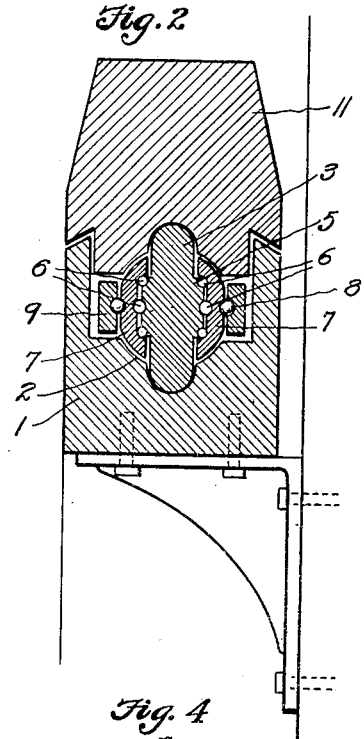
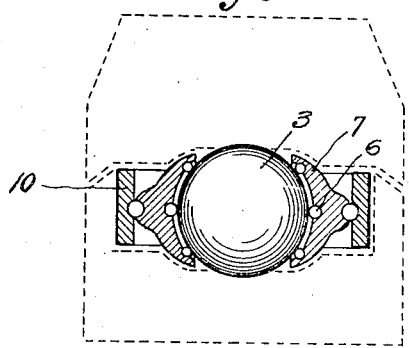
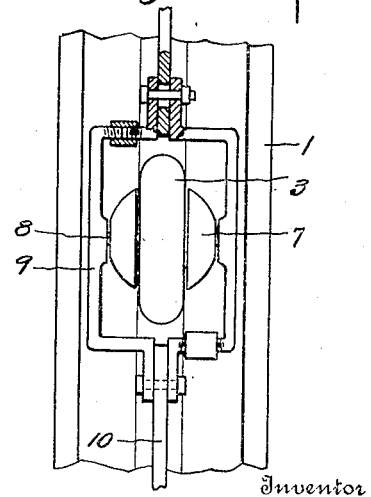
Inventor
JESSE C. WELCH
By Reynolds & Cook
Attorneys

UNITED STATES PATENT OFFICE.

JESSE C. WELCH, OF TACOMA, WASHINGTON.

BEARING.

1,359,007.

Specification of Letters Patent.

Patented Nov. 16, 1920.

Application filed April 2, 1919. Serial No. 286,906.

*To all whom it may concern:*

Be it known that I, JESSE C. WELCH, a citizen of the United States, and resident of Tacoma, county of Pierce, State of Washington, have invented certain new and useful Improvements in Bearings, of which the following is a specification.

This invention relates to new and useful improvements in bearings, and the object of this improvement is to provide a bearing of a compound form of construction comprising a plurality of co-acting units to compensate for the vertical and lateral pressures as may be applied thereto.

A further object resides in the provision of a bearing that will greatly reduce friction from the surfaces of rolling contact where the pressures are laterally applied, hence reducing excessive wear upon these rolling surfaces.

The invention consists in the arrangement, construction and combination of parts, as will be more fully described in the following specifications, illustrated in the accompanying drawings and finally pointed out in the appended claims.

In the drawings:

Figure 1 is a view in side elevation of my compound bearing as applied to a wheel structure.

Fig. 2 is a vertical section of the same.

Fig. 3 is a vertical section of an alternatively form of construction.

Fig. 4 is a plan view of the bearings in assembled position.

Referring more particularly to the drawings, in which like reference numerals indicate like parts, the numeral 1 represents a stationary member provided with a continuous raceway 2 around its outer periphery for the reception of the bearing to illustrate the application thereof.

This bearing consists of a roller 3 having a hub 5 at its axis, as shown in Fig. 2, the hub being preferably provided with a plurality of sockets on its respective ends for the reception of balls 6.

Oppositely disposed on both sides of the roller 3 are crescent shaped rollers 7, having correspondingly shaped sockets on their interior faces within which the balls 6 are in rolling contact. Sockets are similarly provided upon the outer peripheries of the roller bearings 7 for the reception of balls 8 that are correspondingly rotatably disposed within sockets provided in the housing 9 that laterally incases the bearing constituting one of a series of unit structures that are preferably placed around the periphery of the member 1, in spaced apart relation, and are connected together by links 10.

The bearing as shown in Fig. 3 differentiates from the bearing, as described, in one particular only in that the roller 3 can be spherically shaped with the hubs eliminated therefrom.

A bearing of this compound form construction is particularly applicable for sustaining forces of vertical and lateral pressures rotatably applied with a minimum of frictional resistance, as for instance, in its application to the construction as herein shown it is obvious that vertical pressure applied to the rim 11, which is rotatably disposed thereupon, will exert a thrust upon the roller 3, and the lateral and other pressures applied to the rim at an inclination from the vertical will exert a thrust upon the rollers 7, which, being disposed in rolling contact upon the roller 3 is rotatably actuated with respect thereto, hence reducing friction by yielding under the thrust and communicating the lateral pressures to the other co-acting parts to be borne equally thereby.

What I claim as new and desire to protect by Letters Patent is:

1. The combination with complementary bearing members, each having a central raceway and concentrically curved bearing surfaces at opposite sides thereof, of a bearing comprising a central roller operable within the central raceways and paired side members operable upon the central roller and having concentrically curved rolling surfaces engageable with the said concentrically curved surfaces in the complementary members on any lateral movement of the latter.

2. The combination with complementary bearing members, each having a central raceway and concentrically curved bearing surfaces at opposite sides thereof, of a bearing comprising a central roller operable within the central raceways outwardly disposed members at opposite sides of the central roller having concentric rolling surfaces engageable with the concentrically curved surfaces of the complementary members on any lateral movement of the latter, balls interposed between the central and side members and means for sustaining said members in functional position.

3. The combination with complementary bearing members each having a central raceway and concentrically curved bearing surfaces at opposite sides thereof, of a bearing comprising a central roller operable within the central raceways outwardly disposed members at opposite sides of the central roller having concentric rolling surfaces engageable with the concentrically curved surfaces of the complementary members on any lateral movement of the latter, balls interposed between the central and side members, a cage for said bearing members and ball pivot at each side of the bearing located in the axial line of the central roller to support and retain the bearing members in functional position within the cage.

Signed at Tacoma, Washington, this 24th day of March, 1919.

JESSE C. WELCH.